United States Patent
Iwasaki et al.

(10) Patent No.: US 9,134,437 B2
(45) Date of Patent: Sep. 15, 2015

(54) RADIATION DETECTING DEVICE

(75) Inventors: Tatsuya Iwasaki, Machida (JP);
Nobuhiro Yasui, Yokohama (JP); Toru Den, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 383 days.

(21) Appl. No.: 13/544,096

(22) Filed: Jul. 9, 2012

(65) Prior Publication Data
US 2013/0022169 A1 Jan. 24, 2013

(30) Foreign Application Priority Data
Jul. 21, 2011 (JP) ................................ 2011-159915

(51) Int. Cl.
*G01N 23/04* (2006.01)
*G01T 1/202* (2006.01)

(52) U.S. Cl.
CPC ...................................... *G01T 1/202* (2013.01)

(58) Field of Classification Search
CPC ............................ G01T 1/202; G01T 1/1644
USPC .............. 378/62; 250/370.09, 370.11–370.14
See application file for complete search history.

(56) References Cited

U.S. PATENT DOCUMENTS

| 7,864,307 | B2 | 1/2011 | Fukutani et al. | |
|---|---|---|---|---|
| 7,916,283 | B2 | 3/2011 | Fukutani et al. | |
| 8,293,125 | B2 | 10/2012 | Imada et al. | |
| 2006/0131509 | A1 | 6/2006 | Matz et al. | 250/370.11 |
| 2007/0040125 | A1 | 2/2007 | Sato et al. | |
| 2007/0075254 | A1* | 4/2007 | Shoji et al. | 250/370.11 |
| 2011/0158493 | A1 | 6/2011 | Nagai et al. | |
| 2012/0236988 | A1 | 9/2012 | Den et al. | |
| 2012/0292516 | A1* | 11/2012 | Yasui et al. | 250/361 R |

FOREIGN PATENT DOCUMENTS

| JP | 2004-271333 | A | 9/2004 |
|---|---|---|---|
| JP | 2006-177940 | | 7/2006 |
| JP | 2008-051626 | A | 3/2008 |
| JP | 200851626 | * | 3/2008 |
| WO | 2004-079397 | A1 | 9/2004 |

OTHER PUBLICATIONS

JPO Office Action issued Jan. 27, 2015, in counterpart Japanese patent application 2011-159915 (see above for relevance).

* cited by examiner

*Primary Examiner* — Michael Maskell
(74) *Attorney, Agent, or Firm* — Fitzpatrick, Cella, Harper & Scinto

(57) ABSTRACT

Provided is a radiation detecting device, including: a scintillator which emits light when radiation is irradiated thereto; and a photosensor array having light receiving elements for receiving the emitted light which are two-dimensionally arranged, in which: the scintillator has a phase separation structure for propagating the light emitted inside the scintillator in a light propagating direction, the phase separation structure being formed by embedding multiple columnar portions formed of a first material in a second material; the radiation is irradiated to the scintillator from a direction which is not in parallel to the light propagating direction; and the light emitted inside the scintillator is propagated through the scintillator in the light propagating direction and is received by the photosensor array which is placed so as to face an end face of the scintillator.

20 Claims, 6 Drawing Sheets

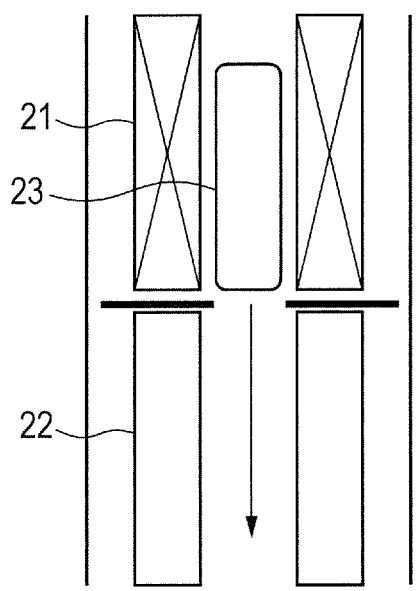
FIG. 2A
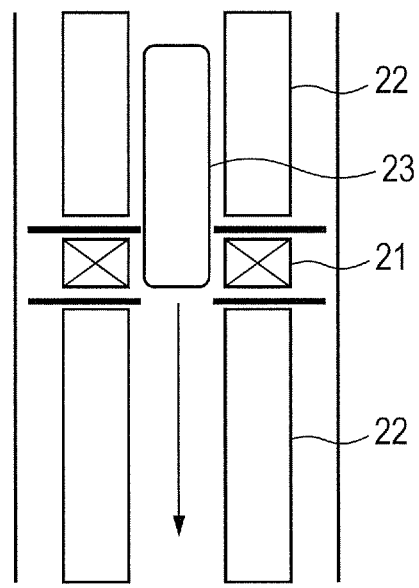
FIG. 2B
FIG. 3
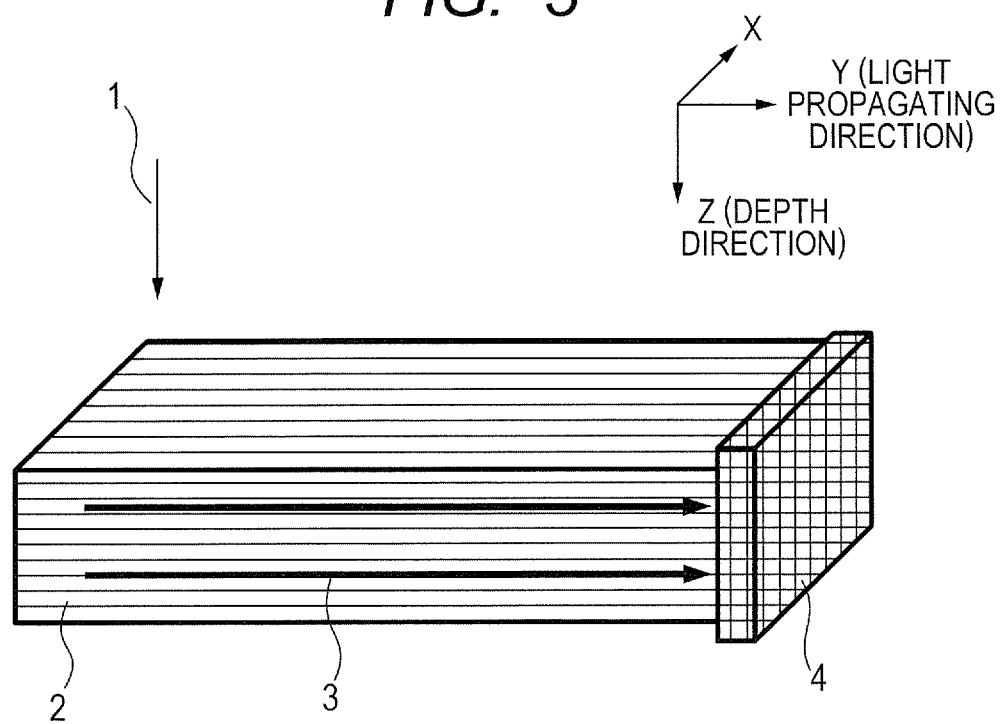

X
Y (LIGHT PROPAGATING DIRECTION)
Z (DEPTH DIRECTION)

RADIATION DETECTING DEVICE

BACKGROUND OF THE INVENTION

1. Field of the Invention

The present invention relates to a radiation detecting device using a scintillator which may propagate light in a specific direction.

2. Description of the Related Art

As a radiation detecting device for medical care or for industrial use which is used for detecting X-rays or gamma rays, there is known a radiation detecting device in which radiation is received by a scintillator and light emitted from the scintillator is detected by a photodetector. Further, a sensor array in which photodetectors are arranged two-dimensionally is used so that an image of the radiation is obtained.

Further, as disclosed in Japanese Patent Application Laid-Open Nos. 2004-271333 and 2008-51626, a radiation detecting device also has the function of discriminating radiation energy.

Japanese Patent Application Laid-Open No. 2004-271333 discloses, as a radiation detecting device having the function of discriminating energy, a structure in which multiple panels, each of which is formed by depositing a scintillator on a substrate of a light transmitting material, are stacked.

However, a scintillator is prepared for each kind of energy to be discriminated and the scintillators are stacked to form the radiation detecting device, and thus, a radiation detecting device having such a structure has problems in that the number of parts is large and the structure is complicated.

SUMMARY OF THE INVENTION

The present invention has been made to solve the above-mentioned problems, and an object of the present invention is to realize a radiation detecting device (radiation image sensor) having a function of discriminating energy with a small number of parts and with a simple structure.

Another object of the present invention is to realize a radiation detecting device (radiation image sensor) which has high function of discriminating energy and is capable of obtaining a high definition image with a relatively simple structure.

According to the present invention, there is provided a radiation detecting device, including: a scintillator which emits light when radiation is irradiated thereto; and a photosensor array having light receiving portions for receiving the emitted light which are two-dimensionally arranged, in which: the scintillator has a phase separation structure for propagating the light emitted inside the scintillator in a light propagating direction, the phase separation structure being formed by embedding multiple columnar portions formed of a first material in a second material; the radiation is irradiated to the scintillator from a direction which is not in parallel to the light propagating direction; and the light emitted inside the scintillator is propagated through the scintillator in the light propagating direction and is received by the photosensor array which is placed so as to face an end face of the scintillator.

In particular, the radiation detecting device according to the present invention obtains positional distribution of radiation intensity from a column direction signal of the photosensor array, and simultaneously, obtains radiation energy information from a row direction signal of the photosensor array.

Further, in the radiation detecting device according to the present invention, the scintillator has a shape of a rectangular parallelepiped, the radiation is irradiated to an upper surface of the scintillator, and the photosensor array is placed on a side surface of the scintillator.

Further, the radiation detecting device according to the present invention further includes: a linear slit for shielding part of the radiation, the linear slit being placed above the scintillator; a mechanism for moving the linear slit; and a mechanism for reading change in output of the photosensor array caused by the movement.

Further, in the radiation detecting device according to the present invention, the first material has a refractive index that is lower than a refractive index of the second material, and the first material has a linear absorption coefficient with respect to the radiation that is lower than a linear absorption coefficient of the second material with respect to the radiation.

According to the present invention, by applying a novel structure using a scintillator which may propagate light preferentially in a specific direction, the radiation detecting device (radiation image sensor) having the function of discriminating energy may be realized with a small number of parts.

In particular, the radiation detecting device (radiation image sensor) which has high function of discriminating energy and which may obtain a high definition image may be realized with a relatively simple structure.

Further features of the present invention will become apparent from the following description of exemplary embodiments with reference to the attached drawings.

BRIEF DESCRIPTION OF THE DRAWINGS

FIGS. 2A and 2B are schematic views illustrating methods of manufacturing the scintillator which may be used in the radiation detecting device according to the present invention.

FIG. 3 is a schematic view illustrating a structure of the radiation detecting device according to the present invention.

DESCRIPTION OF THE EMBODIMENT

Figure 1A:
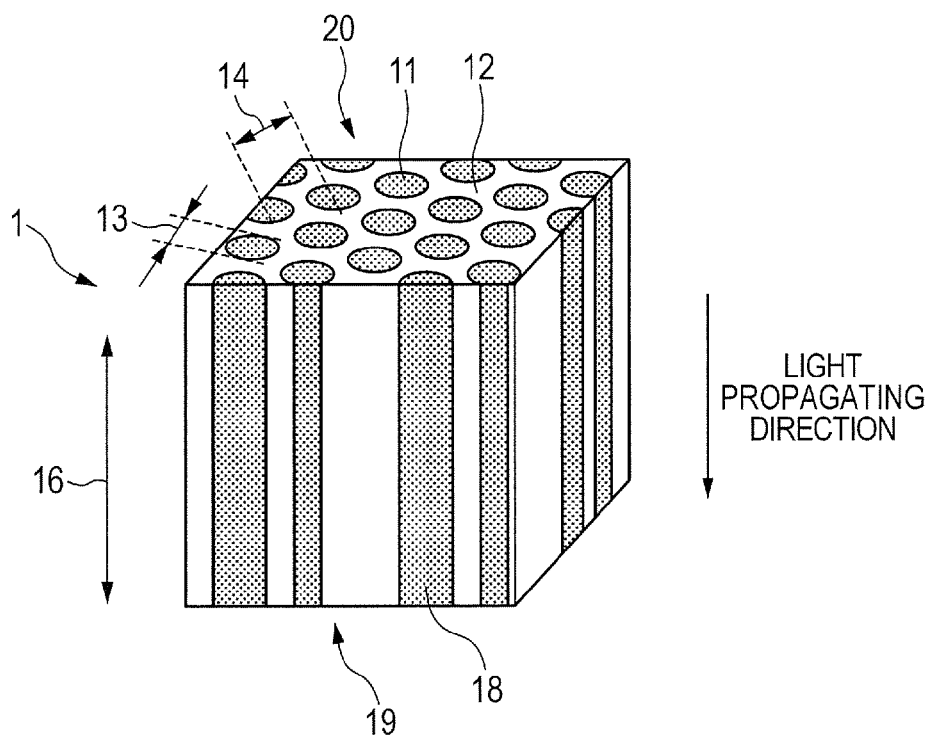
FIGS. 1A and 1B are schematic views illustrating scintillators which may be used in a radiation detecting device according to the present invention.

An embodiment of the present invention is described in the following with reference to the attached drawings.

(Structure of Radiation Image Sensor)

A structure of a radiation detecting device according to the present invention is described with reference to FIG. 3.

FIG. 3 illustrates radiation 1, a scintillator 2, light 3 emitted by the scintillator 2, and a photosensor array 4. Note that, throughout the drawings, the same reference numerals are used to designate the same members.

The radiation 1 is radiation such as X-rays, gamma rays, electron beams, or neutron beams.

The radiation 1 which comes from above in FIG. 3 (not parallel to a light propagating direction) is irradiated to the scintillator 2 substantially along a Z direction to excite the scintillator to emit light. The light 3 emitted by the scintillator which is propagated at a certain angle with respect to the direction in which the radiation comes (direction of application, Z direction) (in FIG. 3, propagated in a Y direction which is perpendicular to the Z direction) is detected by the photosensor array 4 placed so as to face the direction. A signal detected by the photosensor array is processed so that the positional distribution of the radiation intensity and radiation energy information may be detected.

The positional distribution of the radiation intensity is obtained from a column direction signal of the photosensor array (X direction signal of FIG. 3), and at the same time, the radiation energy information is obtained from a row direction signal of the photosensor array (Z direction signal of FIG. 3).

Herein, the energy information refers to signal information stemming from the radiation energy spectrum. Examples of the energy information include the ratio of high energy radiation and low energy radiation, the intensity of radiation having specific energy, the ratio of radiation in a certain energy range, the ratio of radiation in a certain energy range and radiation in another energy range, the quality of radiation, and the half-value layer. Examples of the energy information also include the energy of main radiation among various kinds of radiation irradiated, radiation having the highest energy among various kinds of radiation irradiated, and average energy of radiation. The present invention is not limited to the above, and any signal which varies depending on the difference in radiation energy spectrum falls within the scope of the present invention.

Figure 1B:
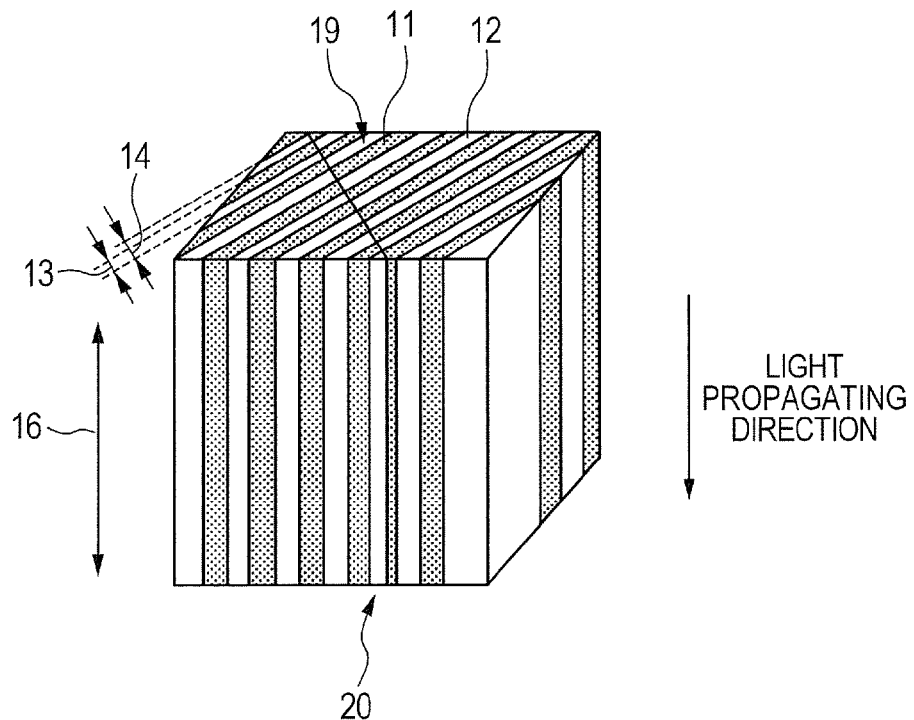

According to the present invention, the scintillator 2 has, for example, the characteristic structure illustrated in FIG. 1A or 1B, and thus, has the function of propagating light preferentially in a specific direction (Y direction of FIG. 3 and direction of the arrow of FIG. 1A or 1B). As illustrated in FIG. 1A, the scintillator 2 has a structure in which multiple columnar portions (phase 11) formed of a first material are embedded in a phase 12 formed of a second material. Light is preferentially guided in, of the two materials, the material having the higher refractive index, and thus, the scintillator may propagate light preferentially in the specific direction (direction of the arrow of FIGS. 1A and 1B). In FIG. 3, the scintillator 2 having the shape of a rectangular parallelepiped is placed so that the direction of the arrow of FIGS. 1A and 1B is the Y direction.

Light emitted in the scintillator is propagated preferentially in the specific direction (Y direction of FIG. 3). The light is received and detected by the photosensor array 4 which is placed on the extension of the direction of light propagated by the scintillator 2. In this case, it is preferred that, for example, the direction perpendicular to a light receiving surface of the photosensor array be the light propagating direction. In the layout illustrated in FIG. 3, the light receiving surface of light receiving elements is an X-Z plane and is directed in a direction perpendicular to the light propagating direction.

In the photosensor array 4, the light receiving elements are two-dimensionally arranged on the light receiving surface.

For example, it is preferred to use semiconductor light receiving elements such as CCD image sensors or CMOS image sensors. Alternatively, a sensor array formed by arranging amorphous Si light receiving elements on a glass substrate may be used. Still alternatively, a structure in which light receiving elements and radiation counter circuits are arranged in an array may be used.

As described above, through use of the scintillator which may propagate light preferentially in the Y direction of FIG. 3, dispersion of light in the X direction and in the Z direction may be suppressed. This enables light emitted by the scintillator to reach the photosensor array without much disturbing the distribution in the X direction of light emitted by the scintillator at the place at which the radiation is irradiated. Therefore, when the light intensity distribution at the photosensor array 4 is measured, the place in the X direction at which the radiation is irradiated and the depth at which the radiation is absorbed (place in the Z direction) may be known. Further, radiation intensity distribution in the X direction and positional distribution in the Z direction at which the radiation causes the scintillator to emit light may be known with sufficient accuracy.

The radiation detecting device has such features, and thus, is an apparatus having excellent spatial resolution in the X direction. Further, as described above, the radiation detecting device may evaluate and discriminate the radiation energy with great accuracy.

In the radiation detecting device according to the present invention, the photosensor array is directed in the direction (−Y direction) perpendicular to the direction of the incident radiation (Z direction), and thus, the radiation is less liable to be directly irradiated to the photosensor array. Therefore, there is an advantage in that the photosensor array is less liable to be damaged when radiation is irradiated. Further, there are less noise signals which are generated by direct application of radiation to the photosensor array, and thus, the radiation detecting device has an excellent S/N ratio.

(Energy Discrimination)

The radiation detecting device according to the present invention has a feature of having a function of discriminating radiation energy in addition to the function of detecting the place at which the radiation is irradiated and the positional distribution of the radiation intensity (image). In the following, the function of discriminating energy of the radiation detecting device according to the present invention is described.

In the radiation detecting device illustrated in FIG. 3, the radiation 1 enters along the Z direction. Low energy radiation causes a portion of the scintillator in a relatively upper layer (a portion which is shallow seen from the surface) to emit light, and on the other hand, high energy radiation causes a portion of the scintillator to a relatively lower layer (to a portion which is deep seen from the surface) to emit light. Therefore, when the position in depth of the light-emitting portion of the scintillator (distribution in a depth direction) is evaluated, information about the radiation energy may be obtained. More specifically, if positional distribution of emitted light in the depth direction (Z direction of FIG. 3) may be determined with accuracy, the radiation energy may be analyzed with great accuracy. Further, the radiation energy may be discriminated and the amount of radiation thereof may be detected. In a radiation image sensor, the energy may be discriminated from one another and an image may be obtained with respect to each kind of the energy.

The depth to which radiation enters varies depending on the energy of the radiation. As the energy of the radiation becomes higher, the radiation enters deeper inside. More specifically, an intensity I of the radiation 1 attenuates according to the following Equation (1) while the radiation 1 is propagated through the scintillator.

$$I = I_0 \exp(-\mu t) \quad (1)$$

In Equation (1), I0 is a radiation intensity before the radiation is irradiated to the scintillator, μ(1/cm) is a linear absorption coefficient which depends on the material of the scintillator and on the radiation energy, and t(cm) is the depth to which the radiation enters.

Therefore, radiations having different kinds of energy behave differently from the viewpoint of attenuation (absorption) in the scintillator. Further, the intensity of light emitted by the scintillator reflects the absorption, and behaves similarly.

In the radiation detecting device according to the present invention, the intensity distribution in the Z direction of light emitted by the scintillator is obtained by using the intensity distribution of light received by the light receiving elements of the photosensor array 4 which are arranged in the Z direction. The intensity distribution in the Z direction of light emitted by the scintillator which is detected by the sensor array varies depending on the radiation energy, and thus, by evaluating the intensity distribution, information about the radiation energy may be obtained. Further, by selecting the position in the Z direction of the light receiving portion to be used of the sensor array, the radiation energy may be discriminated and evaluated.

For example, by comparing a signal detected by a light receiving portion corresponding to a depth Z1 from the surface of the scintillator and a signal detected by a light receiving portion corresponding to a depth Z2 from the surface, information about the radiation energy may be extracted. For example, when Z1<Z2 is satisfied, an image LI of low energy radiation may be obtained from the signal corresponding to the depth Z1 while an image HI of high energy radiation may be obtained from the signal corresponding to the depth Z2. Here, as an example, two kinds of energy are discriminated from each other, but the present invention is not limited to two kinds of energy, and the radiation image sensor may discriminate an arbitrary number of kinds of energy from one another. In this way, for example, the image HI of high energy radiation and the image LI of low energy radiation may be simultaneously obtained.

Other than this, the radiation detecting device may selectively detect high energy radiation by accumulating signals detected by light receiving portions corresponding to a depth ZX and deeper from the surface of the scintillator. More specifically, by selecting the depth ZX depending on the radiation noise environment, low energy radiation may be appropriately excluded to detect radiation.

Figure 7:
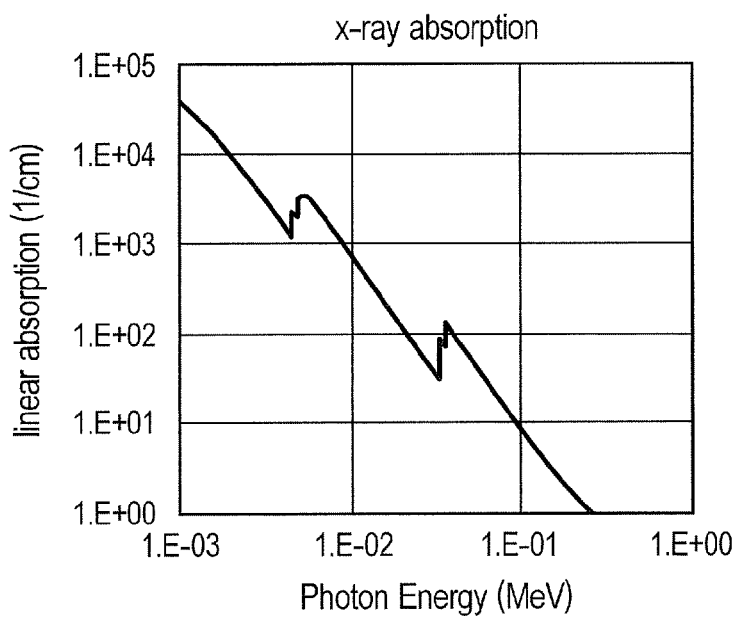
FIG. 7 is a graph showing dependence of a linear absorption coefficient of CsI on X-ray energy.

Other than this, by carrying out parameter fitting using Equation (1) on the data of dependence of the intensity of light emitted by the scintillator on Z (dependence on the depth) obtained by the radiation detecting device according to the present invention, radiation energy may be estimated. If μ may be estimated as the parameter, based on the known dependence of the linear absorption coefficient of the scintillator material on the radiation energy, the energy may be estimated. FIG. 7 is a graph showing dependence of the linear absorption coefficient of CsI on radiation energy as an example. When the scintillator is formed of CsI, the value of μ obtained by parameter fitting using this graph can be used to estimate the radiation energy.

In particular, in the radiation detecting device according to the present invention, the scintillator used may propagate light preferentially in the Y direction of FIG. 3, and thus, the intensity distribution in the Z direction at the place at which the radiation is absorbed (place in the X direction and in the Y direction) may be obtained by the photosensor array without being much damaged. When sensors having small pixel pitches are used as the photosensor array, an excellent function of discriminating energy may be realized.

Further, the function of discriminating energy may be realized by using low-cost CCD sensors or CMOS sensors, and without using a complicated radiation counter circuit including a pulse height discriminator circuit.

The above-mentioned radiation detecting device may be used as a line sensor in the X direction. By spatially moving the radiation detecting device (for example, in the Y direction), the radiation detecting device may be used as an in-plane image sensor. When the radiation detecting device is used for taking a transmission image of an object, by placing the object above the radiation detecting device and moving the object in the Y direction, a transmission image (two-dimensional image) of the object may be obtained.

Embodiment of Scintillator

Next, the scintillator which may be used in the radiation detecting device according to the present invention is described.

FIGS. 1A and 1B are schematic views illustrating scintillators which may be used in the radiation detecting device according to the present invention.

The scintillator 2 has a first principal plane 19 and a second principal plane 20 which are not flush with each other, and includes two phases: a first phase including multiple columnar portions which are unidirectional in a direction passing through the principal planes; and a second phase filling space on the side of the first phase.

FIG. 1A illustrates a structure including two phases which are the first phase 11 including multiple unidirectional columnar portions and the second phase 12 filling space on the side of the first phase 11.

FIG. 1B illustrates a structure in which both the first phase 11 and the second phase 12 include upright plate-like portions along one direction that are in intimate contact with one another.

The scintillator having the structure illustrated in FIG. 1A or 1B uses a phase separation structure which may be manufactured by a phase separation method to be described below. In view of this, the term "phase separation structure" as used herein refers to the structure illustrated in FIG. 1A or 1B. Further, the term "phase separation scintillator" as used herein refers to a scintillator having the structure.

The scintillator may have any one of the following structures: a) a structure in which the refractive index of the first phase (with respect to the wavelength of light emitted by the scintillator) is higher than the refractive index of the second phase; and b) a structure in which the refractive index of the second phase is higher than the refractive index of the first phase. In particular, a structure is preferred in which the first phase having the lower refractive index is located in the second phase having the higher refractive index. With this structure, it is possible to obtain a sufficient waveguiding function (light guiding function) while suppressing the ratio of the first phase in the scintillator.

The light propagating in the high refractive index phase (material) is totally reflected by the lower refractive index phase (material) which is positioned around the higher refractive index phase, and as a result, the light is guided in the higher refractive index phase so as to travel. At that time, because the higher refractive index phase is exposed to the first principal plane and the second principal plane and the exposed portions are connected to each other, the waveguiding (light guiding) is directed to the first principal plane or the second principal plane. In other words, the light generated in the scintillator travels toward the first principal plane or the second principal plane, while being confined within the second phase (i.e., without spreading of the light). Thus, the scintillator itself has a waveguiding function (light guiding function). It is preferred that the first phase, which is the lower refractive index phase, also include portions which are exposed to the first principal plane and the second principal plane, and the exposed portions be connected to each other. With this, the light in the higher refractive index phase can be more reliably guided to the first principal plane or the second principal plane without spreading.

The scintillator may have any one of the following structures: 1) a structure in which the first phase has a light emitting function while the second phase does not have the light emitting function; 2) a structure in which the second phase has the light emitting function while the first phase does not have the light emitting function; and 3) a structure in which both of the first phase and the second phase have the light emitting function.

From the viewpoint of enhancing the brightness of the emitted light, the structure 3) is in particular a preferred structure.

On the other hand, in order to obtain a sufficient waveguiding function (light guiding function), it is preferred that the phase having the higher refractive index have the light emitting function. Therefore, a structure in which the first phase having the lower refractive index is located in the second phase having the higher refractive index and in which the second phase has the light emitting function may realize an excellent waveguiding function (light guiding function) and an excellent light emitting function, which is preferred.

Further, it is desired that a linear absorption coefficient μ1 of radiation in the phase having the light emitting function be larger than a linear absorption coefficient μ2 of radiation in the phase not having the light emitting function. In such a structure, radiation is absorbed preferentially in the phase having the light emitting function. This causes the scintillator to emit light with high intensity by radiation irradiated thereto. Therefore, in a structure in which the first phase is located in the second phase, it is preferred that the first phase have a lower refractive index than that of the second phase, the second phase have the light emitting function, and the first phase have a smaller linear absorption coefficient than that of the second phase. Such a structure may realize an excellent a waveguiding function (light guiding function) and an excellent light emitting function, which is preferred.

When the above-mentioned scintillator is used in the radiation detecting device according to the present invention, it is possible to provide the radiation detecting device which is highly sensitive and excellent in spatial resolution and function of discriminating energy.

A section of the columnar portions 18 (FIG. 1A) which form the first phase 11 of the phase separation scintillator is not limited to a circular shape, oval shape, and square shape, and may be a polygon shape formed by multiple surfaces. It is desired that a diameter 13 of each of the columnar portions 18 be in a range of 50 nm or more to 30 μm or less, preferably in a range of 200 nm or more to 10 μm or less. Further, it is desired that a cycle 14 between the columnar portions 18 of the first phase be in a range of 500 nm or more to 50 μm or less, preferably in a range of 1 μm or more to 20 μm or less. Note that, when the scintillator and a detector or a detector array are used in combination, it is preferred that the columnar portions sized so that multiple columnar portions are placed on the light receiving portion of the photodetector be used in combination. For example, when the light receiving portion is in the shape of a square of 20 μm per side, it is preferred that the columnar portions be sized so that the diameter of the columnar portions is 5 μm and the cycle between the columnar portions is 8 μm. Therefore, it is preferred to use in combination columnar portions having a small size according to the size of the light receiving portion, irrespective of the above-mentioned ranges of the sizes.

It is preferred that the columnar portions be straight and continuous along a thickness direction 16, but the columnar portion may have another structure. For example, a columnar portion is discontinuous midway, a columnar portion branches, multiple columnar portions become one, a columnar portion is not straight and a bent portion is included, or the diameter of a columnar portion partly changes.

In the two phases, as the material which form the phase showing the light emitting function, CsI, CsI:Tl, CsI:In, NaI, $GdO_2S$:Tb, $Bi_4Ge_3O_{12}$, $CeF_3$, $Lu_2SiO_5$:Ce, $BaF_2$, ZnS:Ag may be used. Of those, CsI:Tl, CsI:In, NaI is a particularly preferred material in that a phase separation structure can be easily produced. In the phase not showing the light emitting function, an appropriate transparent material may be employed, for example, an alkali halide such as NaCl, an oxide material such as $SiO_2$ or $Al_2O_3$, a resin material such as acryl or polyimide.

Of those, it is preferred that a phase formed of an alkali halide be used for the first phase and the second phase. Examples of the combination of materials of the first phase and the second phase include NaBr—CsI, NaCl—CsI, NaF—CsI, and KCl—CsI. In those materials, a preferential light emission occurs in CsI, which is the second phase. Other than those given above, examples of the combination of materials of the first phase and the second phase include CsI—NaI, RbI—NaI, NaCl—NaI, and NaF—NaI. Those systems are combinations showing a high light emitting function because both phases show light emitting functions.

Other than the materials given above, examples of the combination of materials of the first phase and the second phase include NaF—RbI, NaCl—RbI, RbI—NaBr, NaF—CsBr, NaCl—CsBr, NaBr—CsBr, NaF—RbBr, RbBr—NaCl, RbBr—NaBr, NaCl—CsCl, NaF—RbCl, and RbCl—NaCl. In addition, as a system using an alkaline-earth metal, examples of the combination of materials of the first phase and the second phase include NaI—$BaI_1$, NaBr—$BaBr_2$, NaCl—$BaCl_2$, NaBr—$SrBr_2$, and NaCl—$SrCl_2$. When those material groups are used, a scintillator having the structure of FIG. 1B can be obtained.

Of those material groups, NaBr—CsI, NaCl—CsI, NaF—CsI, and KCl—CsI are preferred combinations in that the structure of FIG. 1A can be easily produced. Of those, NaCl—CsI is particularly preferred in view of structure control. In this case, NaBr may be added to NaCl, and KCl may be added to NaCl. The second phase may contain rubidium iodide (RbI), cesium bromide (CsBr), or rubidium bromide (RbBr) other than CsI.

In order to realize the above-mentioned preferential transmission (guiding) of light in the specific direction, it is preferred that the difference between the refractive index of the first phase and the refractive index of the second phase be large. In combination with CsI (having a refractive index of 1.80), NaF (having a refractive index of 1.32) is the best, and KCl (having a refractive index of 1.49) is the next best, which is followed by NaCl (having a refractive index of 1.55) and NaBr (having a refractive index of 1.64) in the stated order.

(Method of Manufacturing Scintillator Using Phase Separation Method)

The scintillator having the structure illustrated in FIG. 1A or 1B, that is, a phase separation scintillator, may be manufactured by a phase separation method. More specifically, when a uniform liquid state in which materials are melted and there is no solid structure changes to a solidified state, the two phases simultaneously crystallize out so that a structure having periodicity to some extent can be formed.

A method of manufacturing the scintillator using this phase separation method is described in the following.

The method of manufacturing the phase separation scintillator includes the steps of: mixing a material for forming the first phase and a material for forming the second phase; melting the material for forming the first phase and the material for forming the second phase which are mixed; and solidifying along one direction the material for forming the first phase and the material for forming the second phase which are melted, thereby forming a eutectic.

The method of manufacturing the phase separation scintillator may be an arbitrary method insofar as desired materials of optimum composition are molten and solidified so as to be unidirectional. The Bridgman method, the Czochralski method, and the floating zone method may be used. In particular, the temperature gradient is required to be controlled so that the liquid-solid interface is flat, and it is preferred that the method be performed under the condition that the temperature gradient of the mixture at the liquid-solid interface is 30° C./mm or higher.

FIGS. 2A and 2B are schematic views illustrating methods of manufacturing the scintillator according to the present invention.

As illustrated in FIGS. 2A and 2B, in the Bridgman method, a sample material enclosed in a cylindrical quartz tube or the like so as to prevent oxidation is vertically placed. By moving a heater or the sample at a fixed rate, the position of the solidification interface of the sample may be controlled, and thus, the phase separation scintillator according to this embodiment may be manufactured.

In particular, as illustrated in FIG. 2A, the apparatus includes a heater portion 21 having a length equivalent to the length of a sample 23, and a water cooling portion 22 for realizing the temperature gradient of 30° C./mm or higher at the liquid-solid interface of the sample 23 which is a mixture.

Further, as in the apparatus illustrated in FIG. 2B, the structure may be such that the water cooling portion 22 is provided both at the top and at the bottom and the heater portion 21 covers only a part of the sample 23. A manufacturing method which includes measures equivalent to those is also possible. However, insofar as the liquid-solid interface may be formed to be smooth, the temperature gradient may be lower than 30° C./mm.

The scintillator may also be similarly manufactured by pulling upward a crystal from a molten liquid as in the Czochralski method. In this case, differently from the case of the Bridgman method in which the sample is solidified in a container, the liquid-solid interface may be formed without being affected by the wall surface of the container, which is more preferred. Further, there is a possibility that the scintillator may be manufactured by the floating zone method, but when attention is paid to the materials according to this embodiment, almost no infrared absorption is observed, and thus, direct heating with infrared radiation cannot be adopted as a heating method. Therefore, another appropriate method such as adding another material is necessary.

It is preferred that the composition of the materials for forming the first phase and the second phase included in the scintillator be composition at a eutectic point. A eutectic point is a point at which a eutectic reaction occurs in an equilibrium diagram, and is a point at which two kinds of solid solutions are simultaneously discharged from the liquid phase to complete the solidification.

By selecting such composition and using the manufacturing method described below, the scintillator having the structure illustrated in FIG. 1A or 1B, that is, the phase separation scintillator may be manufactured.

Exemplary composition ratios in preferred combinations of the materials for forming the first phase and the second phase according to this embodiment are shown in Table 1 below.

TABLE 1

| First Phase: Second Phase | Eutectic Composition [mol %] | Eutectic Temperature [° C.] |
| --- | --- | --- |
| NaBr:CsI | 40:60 | 432 |
| NaCl:CsI | 31.5:68.5 | 490 |
| NaF:CsI | 5:95 | 599 |
| KCl:CsI | 40:60 | 447 |

When composition in a range close to those composition ratios is used, a good quality structure as illustrated in FIG. 1A may be obtained in which, in forming the structure, the phases are in a eutectic relationship with each other, and, around the eutectic compositions, unidirectional solidification is carried out.

Further, the diameter and the cycle of the columnar portions of the phase separation scintillator depend on the solidification rate of the sample. The manufacturing method limits the solidification rate which enables control of the liquid-solid interface so as to be flat and smooth. Therefore, it is preferred that a cycle $\lambda$ be in the range of 500 nm or more to 50 μm or less. The diameter of the columnar portions is in the range of 50 nm or more to 30 μm or less accordingly.

Here, a section of the columnar portions is not required to be circular. When the section is of indefinite shape, the smallest diameter is in the above-mentioned range. Further, it is preferred that the ratio of the largest diameter to the smallest diameter of the multiple columnar portions on average be 10 or smaller.

Example 1

Example 1 of the present invention is an example of a radiation detecting device having the function of discriminating energy according to the present invention. A phase separation scintillator including CsI and NaCl is used.

First, the scintillator having the phase separation structure illustrated in FIGS. 1A and 1B was prepared.

Powder mixtures including 31.5 mol % of NaCl (material for forming the first phase) with respect to CsI (material for forming the second phase) were prepared. Each of the powder mixtures was enclosed in a vacuum quartz tube so as to be used as a sample. Further, 0.01 mol % of InI (indium iodide (I)) was added. Then, the samples were introduced into a Bridgman furnace as illustrated in FIG. 2A, and the temperature was raised to 800° C. After the samples were entirely molten, the state was held for 30 minutes. Then, the temperature of the molten liquid was lowered to a temperature which was higher than the eutectic temperature shown in Table 1 by 20° C. After that, the respective samples were pulled down at a rate of about 10 mm/h to carry out the solidification gradually from the bottom of the samples.

Further, the samples were caused to enter a region in which cooling water of the furnace circulated when the samples were pulled down so that the temperature difference at the liquid-solid interface, which was an interface between the molten sample and the solidified sample, became 30° C./mm or larger. In this way, by solidification along one direction, the eutectic was formed.

The samples which were manufactured in this way were cut, and the structures thereof were observed under a scanning electron microscope (SEM). As a result, as illustrated in FIGS. 1A and 1B, a structure of vertical surfaces in the direction of solidification (structure seen from the first principal plane and the second principal plane) was obtained. Further, composition analysis included in the SEM made it clear that the columnar portions included NaCl, which were surrounded by a portion including CsI. In this way, it was confirmed that a structure in which multiple columnar portions including NaCl were unidirectional and the multiple columnar portions were surrounded by CsI was formed. More specifically, a phase separation scintillator structure was obtained in which the first phase included NaCl and the second phase included CsI.

The light emission by the phase separation scintillator was observed by cathodoluminescence (CL).

Both in the case where the CsI portion was excited and in the case where the columnar portions including NaCl were excited, green light emission was exhibited, but the intensity of emitted light was higher in the CsI portion. More specifically, in the phase separation scintillator of this example, when the scintillator was excited by radiation, both the first phase and the second phase emitted light, but light emission was exhibited preferentially in the second phase.

When a phase separation scintillator having a thickness in the light propagating direction of about 4 mm was placed on a paper surface having letters written thereon, it was confirmed that the letters printed on the paper surface looked as if the letters protruded through the phase separation scintillator. More specifically, the phase separation scintillator has a property of propagating light preferentially in the light propagating direction indicated in FIG. 1A or 1B.

Transmission images were observed under an optical microscope, and structures corresponding to FIGS. 1A and 1B were confirmed. Further, in a transmission image, clearly the columnar portions including NaCl were observed as dark points, and CsI portion as the matrix side looked brighter. In other words, more light was guided through the CsI matrix side as a material having the higher refractive index.

Therefore, it could be confirmed that the phase separation scintillator of this example had a property of guiding light preferentially in the direction of the columnar portions.

Next, the above-mentioned phase separation scintillator was placed so that the light propagating direction was perpendicular to the light receiving surface of the photosensor array to form the radiation detecting device illustrated in FIG. 3. As the photosensor array, CMOS sensors which were sized to be 49 mm×49 mm with pixel pitches of 48 μm (1,024×1,024 pixels) were used. The dimensions of the scintillator were 30 mm in the X direction, 20 mm in the Y direction, and 10 mm in the Z direction. More specifically, the scintillator was placed so that the first principal plane or the second principal plane thereof faced the light receiving surface of the photosensor array.

In this example, the photosensor array and the phase separation scintillator were in direct contact with each other, but the scintillator may also be joined or placed on the surface of the photosensor array via a protective layer, or a film or layer having an antireflective function or the like.

As a comparative example, a radiation detecting device using a scintillator including CsI monocrystal instead of the phase separation scintillator was prepared.

Then, X-rays were irradiated to the radiation detecting device. The X-rays used were obtained by using a tungsten light bulb under the conditions of 60 kV, 1 mA, and without an Al filter. Spot-like X-rays were irradiated to the scintillator by using an opening of $\phi$100 μm in a tungsten plate having a thickness of 2 mm. The position of the spot was 30 mm away from the surface of the photosensor array in the negative Y direction.

In the radiation detecting device of Example 1, signal output in the X direction obtained by the photosensor array, that is, light intensity distribution, was evaluated. In reflection of the shape of the spot of the irradiated X-rays, light intensity distribution having a peak was obtained. Further, in the structure using the phase separation scintillator of Example 1, compared with that of the comparative example, spread of the peak of the light intensity profile (distribution width) was smaller. The reason is that the phase separation scintillator propagated light emitted by the scintillator preferentially in the light propagating direction (Y direction). This indicates that, compared with the radiation detecting device of the comparative example, the radiation detecting device of Example 1 may obtain an image at higher spatial resolution.

Then, X-rays obtained under the conditions of 30 kV and without an Al filter and X-rays obtained under the conditions of 200 kV and with an Al filter of 6 mm were irradiated simultaneously to the radiation detecting device of Example 1. Intensities P1 and P2 of the respective X-rays were changed independently. It could be confirmed that the output profile in a row direction of the photosensor array changed. This indicates that the intensity profile in the Z direction of the light emitted by the scintillator changed, and further, that the difference in energy spectrum of the irradiated radiation may be detected (discriminated) by the output in the row direction of the photosensor array.

Further, in the structure using the phase separation scintillator of Example 1, compared with that of the comparative example, change in intensity profile in the Z direction was more remarkable, and extraction of the difference was easier. In other words, the radiation detecting device of Example 1 may extract information about the energy of the X-rays with higher sensitivity (accuracy) compared with that of the comparative example.

The radiation detecting device of Example 1 may discriminate radiations having different energies from one another from the signal intensity profile in the Z direction of the photosensor array. Further, the discrimination of energy of the radiation may be made with regard to every X coordinate (every column of the photosensor array).

As described above, the structure according to the present invention may realize a radiation detecting device which has, in addition to the function of obtaining a line image in the X direction, the function of discriminating energy at each X coordinate.

Compared with a conventional image sensor having the function of discriminating energy, the number of parts is significantly small. Further, the scintillator which guides light preferentially in a specific direction and a high definition photosensor array are irradiated, and thus, a high definition image and high function of discriminating energy may be realized.

The radiation detecting device according to the present invention may be used as a radiation detecting device for medical care, for industrial use, for high-energy physics, and for space use.

In particular, when the above-mentioned X-ray detecting device having the function of discriminating energy is irradiated to an X-ray non-destructive inspection apparatus, information about the quality of the material of a substance may be obtained.

Example 2

Figure 4:
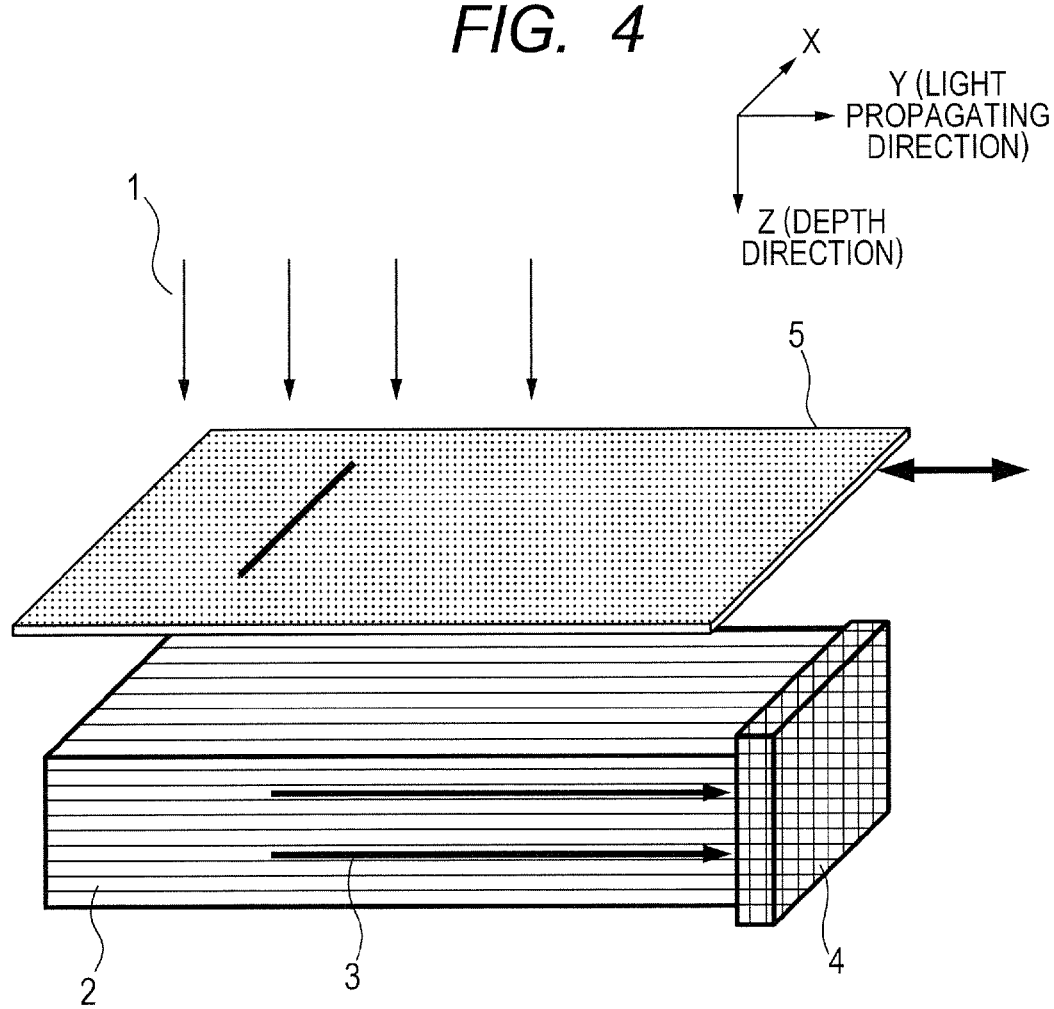
FIG. 4 is a schematic view illustrating a structure of the radiation detecting device (radiation image sensor) according to the present invention.

Example 2 of the present invention is an example of a radiation detecting device having a structure illustrated in FIG. 4. In this example, a linear slit 5 for shielding part of radiation was placed above a radiation detecting device which was similar to that of Example 1. The linear slit 5 had an opening therein having a length in the X direction of 80 mm and a width (Y direction) of 200 μm, and was formed of tungsten having a thickness of 3 mm. The linear slit 5 was placed at a distance of 1 cm from the scintillator 2 so as to face the scintillator 2, and had a mechanism movable in the Y direction.

As the photosensor array of this example, CMOS sensors which were sized to be 99 mm×49 mm with pixel pitches of 48 μm (2,048×1,024 pixels) were used.

The scintillator used in this example was a phase separation scintillator including CsI and NaCl which was manufactured by the Czochralski method. As a luminescent center, 0.05 mol % of Tl was added. Three scintillators each having the dimension of 30 mm in the X direction, 50 mm in the Y direction, and 10 mm in the Z direction were arranged on the CMOS sensor side by side so that the scintillators had an area of 90 mm (X direction)×50 mm (Y direction).

In this example, while radiation was irradiated to the entire upper surface of the radiation detecting device, the linear slit was moved in the Y direction (light propagating direction) at 3 mm/sec. The photosensor array obtained output change of the photosensor array in time sequence according to the movement of the linear slit.

The radiation detecting device of this example could obtain a two-dimensional image. Data corresponding to the radiation intensity in the X direction could be obtained from the output in the X direction of the photosensor array, while data corresponding to the radiation intensity in the Y direction could be obtained from change in the output of the photosensor array over time. In this case, by accumulating all pixel signals in the Z direction, sufficient signal intensity may be obtained in a short time. In this way, based on the change in the intensity distribution in the X direction over time, the X-Y plane intensity distribution (X-Y plane image) of the radiation may be obtained.

Further, through use of the output in the Z direction of the photosensor array, information about radiation energy at the respective X and Y coordinates may be obtained. More specifically, the value of S1/S2 was used, where S1 is an intensity of the accumulated signals of pixels having depths in the Z direction of 50 to 300 μm, and S2 is an intensity of the accumulated signals of pixels having depths in the Z direction of 500 to 1,500 μm. S1 and S2 may be regarded as a low energy X-ray signal intensity and a high energy X-ray signal intensity, respectively. S1/S2 is information corresponding to the ratio of low energy X-rays to high energy X-rays. By calculating the value of R=S1/S2 with regard to the respective positions of X coordinates and the respective time points t, the X-Y plane image of R=S1/S2 may be obtained.

In this way, the radiation detecting device of this example may simultaneously obtain the X-Y plane radiation intensity image and the radiation energy information (R) image.

The structure of this example may be used as an X-ray image sensor having the function of discriminating energy.

Example 3

Example 3 of the present invention has a structure which is similar to that of Example 1, but, as the photosensor array, amorphous Si light receiving elements and amorphous Si TFTs which are arranged on a glass substrate are used. The photosensor array is sized to be 300 mm×20 mm with pixel pitches of 150 μm.

Eight phase separation scintillators each having the dimension of 30 mm in the X direction, 20 mm in the Y direction, and 10 mm in the Z direction are arranged side by side on the photosensor array so that the scintillators have an area of 240 mm (X direction)×20 mm (Y direction).

In each column of the photosensor array, accumulation of data of the first and second rows (corresponding to depths in the Z direction of 0 to 300 μm), accumulation of data of the third to sixth rows (corresponding to depths in the Z direction of 300 μm to 900 μm), and accumulation of data of the seventh and further rows (corresponding to depths in the Z direction of 900 μm or more) are obtained as output D1 ($x$), output D2 ($x$), and output D3 ($x$), respectively. The radiation energy may be discriminated as low energy, medium energy, or high energy by using the outputs D1, D2, and D3, respectively.

The structure of this example may be used as an X-ray line sensor having the function of obtaining information about radiation energy. By translating the line sensor, a two-dimensional radiation image may also be obtained.

Example 4

Figure 5:
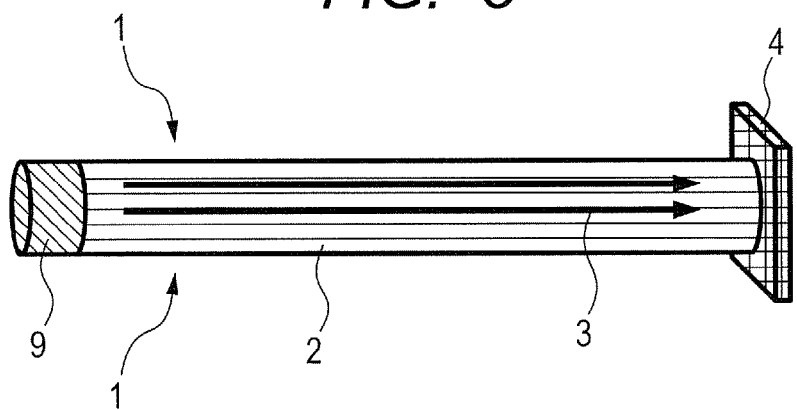
FIG. 5 is a schematic view illustrating a structure of a bar-like radiation detecting device according to the present invention.

Example 4 of the present invention is an example of a radiation detecting device using a bar-like scintillator illustrated in FIG. 5.

The scintillator is in the shape of a circular cylinder having a diameter of 20 mm and a length of 100 mm. The axial direction of the cylinder is the light propagating direction. CMOS sensors having a light receiving surface of 36 mm×24 mm are placed at an end of the bar-like scintillator. A cap 9 having a thickness of 5 mm and formed of tungsten is attached to the other end of the scintillator. The cap 9 suppresses entrance of radiation from the end face of the bar-like scintillator. Light is not emitted by the scintillator due to radiation irradiated to the end face, and thus, accurate evaluation of energy information may be made.

Further, a radiation blocking cover (not shown) is placed around the photosensor array so that radiation is not directly irradiated to the photosensor array.

Further, in this example, the radiation detecting device is placed so that radiation is irradiated from a direction perpendicular to the axis of the cylinder. However, the present invention is not limited thereto and the direction from which radiation is irradiated is arbitrary insofar as the direction is not the axial direction of the cylinder.

In the radiation detecting device of this example, the radiation intensity may be measured from the total sum of output of all the pixels of the photosensor array. Further, a graph of light intensity output with respect to a distance (r) from the center of the photosensor array in a direction from the center of the axis toward the outside is plotted. Information about the radiation energy may be extracted from the graph. When the diameter of the cylinder is represented by 2R, the depth from the surface of the cylinder is R-r.

In this example, the energy information is extracted by graph fitting using the graph showing dependence of the light intensity on r. On the assumption of existence of multiple kinds of radiation having different kinds of energy, fitting of the parameters I0 and μ based on Equation (1) may be carried out with regard to the graph showing dependence of light intensity on Z. By the fitting which is based on Equation (1), with I0 and μ being the fitting parameters, and which uses two kinds of exp functions, intensities I0_a, I0_b and μ_1, μ_2 of two kinds of radiation, respectively, may be extracted. Through use of the dependence of μ on the energy of the scintillator material, estimation of the radiation energy from the value of μ may be made.

In this way, the radiation detecting device of this example may extract the radiation energy information.

Further, when the radiation detecting device is used as a probe and is spatially moved, spatial distribution of the radiation may be obtained.

Example 5

Figure 6:
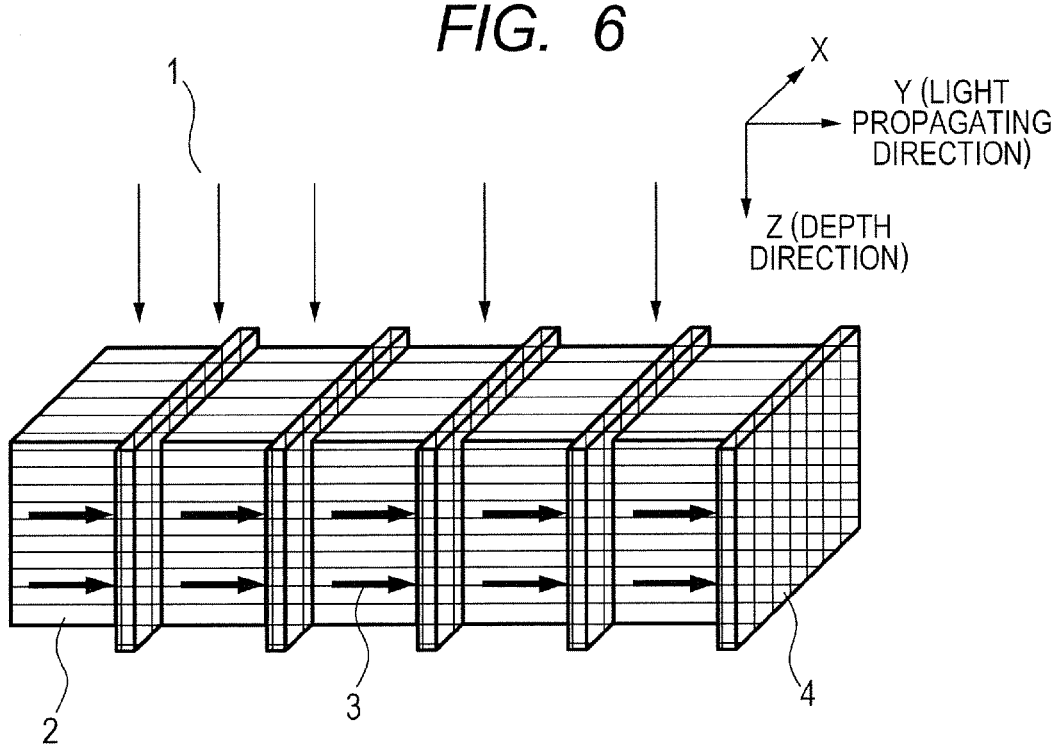
FIG. 6 is a schematic view illustrating a structure of a radiation detecting device using multiple scintillators and photosensor arrays.

Example 5 of the present invention is an example of a radiation image sensor having a structure in which multiple radiation detecting device of Example 1 are arranged as illustrated in FIG. 6. The thickness of each of the scintillators in the Y direction is 0.5 mm.

By integrating and evaluating the outputs by the multiple photosensor arrays, the dependence of the radiation intensity on the position in the Y direction may be evaluated. More specifically, an image may be obtained in which the sum of the thicknesses of the scintillator and the photosensor array in the Y direction is the cycle in the Y direction. The radiation intensity in the X direction may be obtained as the output in the column direction of the photosensor arrays, and thus, based on the both intensities, the X-Y distribution image of the radiation intensity may be obtained. Further, from the output in the Z direction, information about the energy may be obtained. It follows that the radiation image sensor has the function of discriminating energy.

Example 6

Example 6 of the present invention is an example of a radiographic imaging apparatus using the radiation detecting device of Example 3 (X-ray line sensor having the function of discriminating energy).

Figure 8:
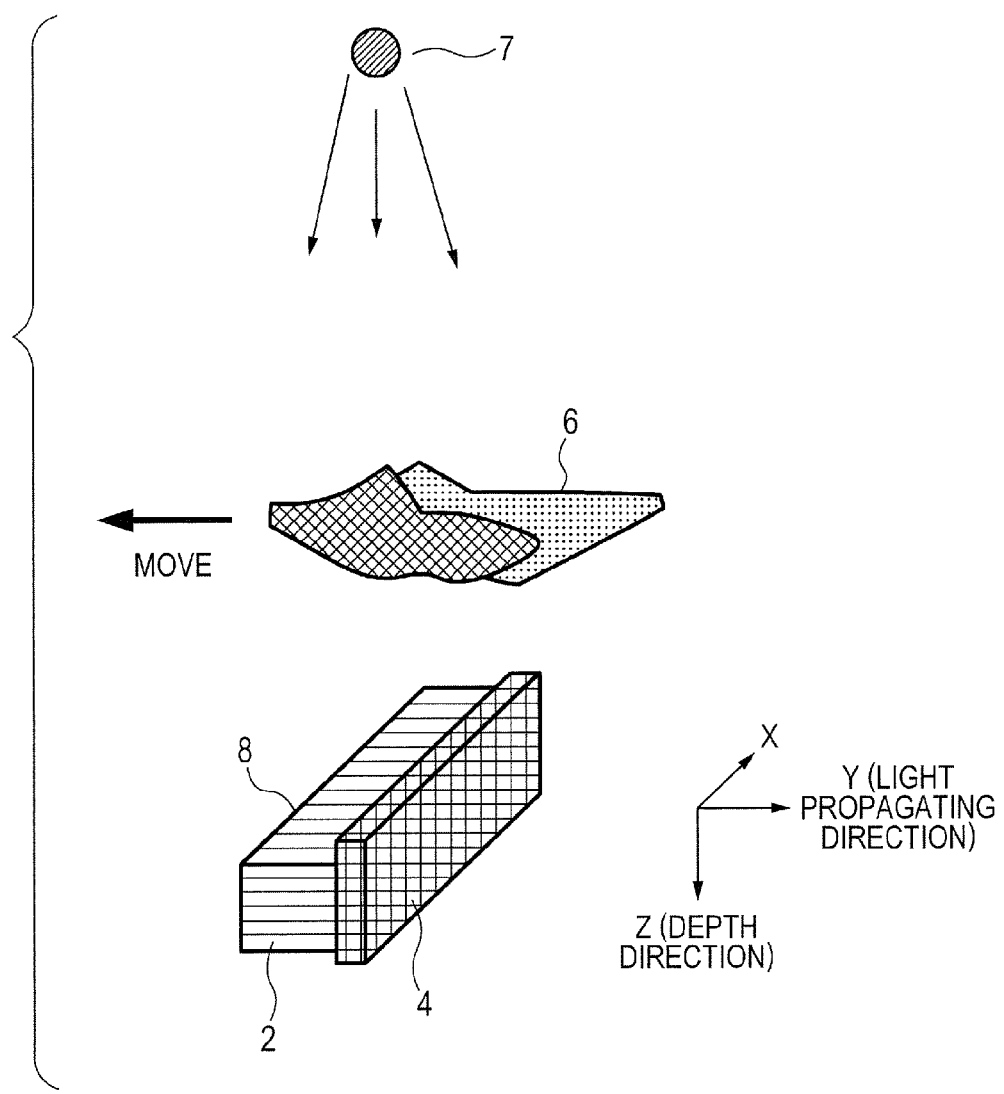
FIG. 8 is a schematic view illustrating a case where the radiation detecting device according to the present invention is used in a radiographic imaging apparatus.

As illustrated in FIG. 8, an object 6 (sample) is placed between a radiation source 7 and a radiation detecting device 8 which is the radiation detecting device of Example 3 and which includes the photosensor array 4 and the scintillator 2.

The object 6 is moved while radiation is output from the radiation source, and at the same time, an image of radiation which passes through the object and energy information are obtained by the photosensor array 4. The radiation source is a tungsten light bulb of 160 kV, and outputs X-rays having energy of a wide range.

In this structure, a gray-scale image according to the transmittance of the radiation through the object is obtained by the photosensor array. When the object is moved in the Y direction, based on the positional distribution in the X direction of the output of the photosensor array which changes over time, a two-dimensional image (X-Y plane image) may be obtained. Further, from the output in the Z direction of the photosensor array, information about the radiation energy may be obtained. Based on the output of pixels at a specific position in the Z direction similarly to the case of Example 3, a transmission image of high energy radiation and a transmission image of low energy radiation may be discriminated from each other and simultaneously obtained. Through use of the above-mentioned radiation detecting device having the function of discriminating energy, information about the quality of a material of the object may be obtained by using the difference in radiation energy.

When the above-mentioned X-ray detecting device having the function of discriminating energy is irradiated to a radiographic imaging apparatus (X-ray non-destructive inspection apparatus), information about the quality of a material of a substance may be obtained.

Example 7

Example 7 of the present invention is an example of a radiographic imaging apparatus using the radiation detecting device of Example 3 (X-ray line sensor having the function of discriminating energy).

Figure 9:
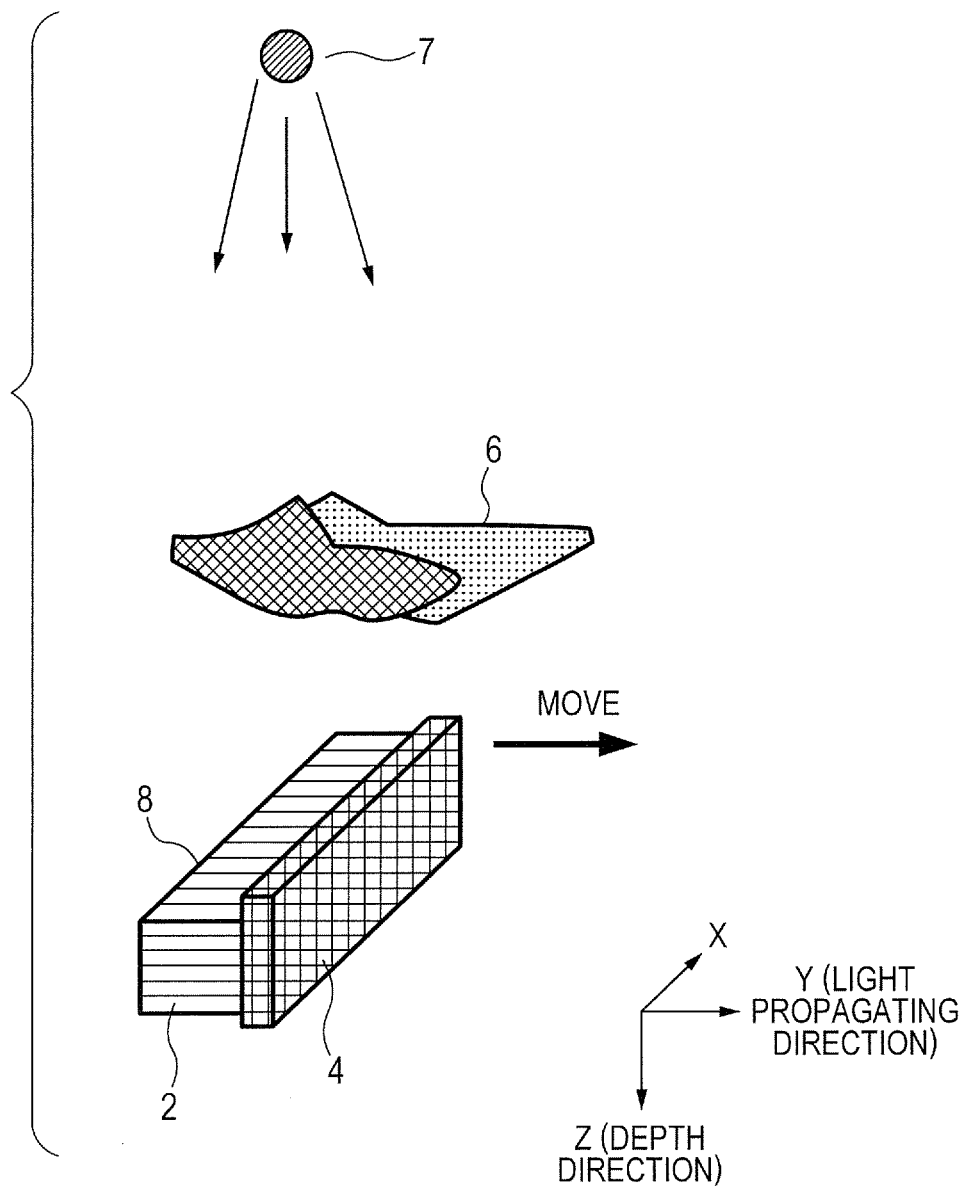
FIG. 9 is a schematic view illustrating another case where the radiation detecting device according to the present invention is used in the radiographic imaging apparatus.

As illustrated in FIG. 9, the object 6 (sample) is placed between the radiation source 7 and the radiation detecting device 8 which is the radiation detecting device of Example 3 and which includes the photosensor array 4 and the scintillator 2.

The radiation detecting device 8 is moved while radiation is output from the radiation source, and at the same time, an image of radiation which passes through the object and energy information are obtained by the photosensor array 4. The radiation source is a tungsten light bulb of 160 kV, and outputs X-rays having energy of a wide range.

In this structure, a gray-scale image according to the transmittance of the radiation through the object is obtained by the photosensor array. When the radiation detecting device is moved in the Y direction, based on the positional distribution in the X direction of the output of the photosensor array which changes over time, a two-dimensional image (X-Y plane image) may be obtained. Further, from the output in the Z direction of the photosensor array, information about the radiation energy may be obtained. Based on the output of pixels at a specific position in the Z direction similarly to the case of Example 3, a transmission image of high energy radiation and a transmission image of low energy radiation may be discriminated from each other and simultaneously obtained. Through use of the above-mentioned radiation detecting device having the function of discriminating energy, information about the quality of a material of the object may be obtained by using the difference in radiation energy.

When the above-mentioned X-ray detecting device having the function of discriminating energy is irradiated to a radiographic imaging apparatus (X-ray non-destructive inspection apparatus), information about the quality of a material of a substance may be obtained.

The radiation detecting device having the function of discriminating energy according to the present invention may be used in a radiation image sensor for medical care or for industrial use, a measuring apparatus for high-energy physics or for space use, and the like which use radiation such as X-rays or gamma rays.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-159915, filed Jul. 21, 2011, which is hereby incorporated by reference herein in its entirety.

What is claimed is:

1. A radiation detecting device, comprising:
   a scintillator which emits light when irradiated with radiation; and
   a photosensor array having light receiving elements for receiving the emitted light which are two-dimensionally arranged,
   wherein said scintillator comprises:

a first plane and a second plane, said first plane and said second plane being not coplanar with each other;

a phase separation structure having multiple first phases and a second phase filling space on sides of said first phases; and an incident plane in which radiation enters, said incident plane being not parallel to said first plane and said second plane, and wherein said first phase and said second phase each have a different refractive index from each other for the light emitted by said scintillator, said first phase comprises a first material and said second phase comprises a second material, and said second phase is continuously present from a part of said first plane to a part of said second plane.

2. The radiation detecting device according to claim 1, wherein the radiation detecting device obtains positional distribution of radiation intensity from a column direction signal of said photosensor array, and simultaneously, obtains radiation energy information from a row direction signal of said photosensor array.

3. The radiation detecting device according to claim 2, wherein:

said scintillator has a shape of a rectangular parallelepiped;

the radiation impinges on an upper surface of said scintillator;

said photosensor array is placed on a side surface of said scintillator; and a plane where said photosensor array is placed is said first plane or said second plane, and a plane irradiated with radiation is not said first plane nor said second plane.

4. The radiation detecting device according to claim 1, further comprising:

an element having a linear slit, for shielding a part of the radiation, said element being placed between a surface of said scintillator on which radiation is incident and a direction from which the radiation is incident;

a mechanism for moving said element; and a mechanism for reading change in output of said photosensor array caused by the movement.

5. The radiation detecting device according to claim 1, wherein said first material has a refractive index that is lower than a refractive index of said second material.

6. The radiation detecting device according to claim 5, wherein said first material has a linear absorption coefficient with respect to the radiation that is lower than a linear absorption coefficient of said second material with respect to the radiation.

7. The radiation detecting device according to claim 1, wherein the light receiving elements of said photosensor array are placed so as to be perpendicular to the light propagating direction, which is a direction connecting said first plane and said second plane.

8. The radiation detecting device according to claim 1, wherein the radiation detecting device obtains intensity distribution of the light emitted inside said scintillator with respect to a depth direction of said scintillator from intensity distribution of the light received by said light receiving elements arranged in a depth direction of said photosensor array.

9. The radiation detecting device according to claim 1, wherein each of said multiple first phases each has a columnar shape and has a diameter of 50 nm or more to 30 µm or less and said multiple columnar portions are arranged with a cycle of 500 nm or more to 50 µm or less.

10. The radiation detecting device according to claim 1, wherein a ratio of a largest diameter to a smallest diameter of said multiple first phases, which each have a columnar shape, is 10 or smaller, wherein the largest diameter is measured in a unit of length and the smallest diameter is measured in the same unit of length.

11. The radiation detecting device according to claim 1, wherein:

said scintillator has a shape of a bar; and said scintillator has a cap provided on a side of said scintillator which is opposite to a side on which said photosensor array is provided.

12. A radiation image sensor, comprising a plurality of the radiation detecting devices according to claim 1 provided in a light propagating direction.

13. A radiographic imaging apparatus, comprising:

the radiation detecting device according to claim 1; and a radiation source, with provision to receive a sample placed between said radiation detecting device and said radiation source.

14. A radiation detecting device, comprising:

a scintillator which emits light when radiation is irradiated thereto; and a photosensor array having light receiving elements for receiving the emitted light which are two-dimensionally arranged, wherein said scintillator comprises:

a first plane and a second plane, said first plane and said second plane being not coplanar with each other;

a phase separation structure having multiple first phases and a second phase filling space on sides of said first phases; and an incident plane in which radiation enters, said incident plane being not parallel to said first plane and said second plane, and wherein said first phase and said second phase each have a different refractive index from each other for light emitted by said scintillator, said first phase comprises a first material and said second phase comprises a second material, and said first material and said second material are capable of forming a eutectic composition.

15. The radiation detecting device according to claim 1, wherein said first material, which forms said first phase, and said second material, which forms said second phase, are capable of forming a eutectic composition.

16. The radiation detecting device according to claim 14, wherein said first material and said second material form a eutectic.

17. The radiation detecting device according to claim 15, wherein said first material and said second material form a eutectic.

18. The radiation detecting device according to claim 14, wherein said first phase is continuously present from a part of said first plane to a part of said second plane.

19. The radiation detecting device according to claim 17, wherein said first phase is continuously present from a part of said first plane to a part of said second plane.

20. The radiation detecting device according to claim 1, wherein said first phase and said second phase each are crystal.

* * * * *